Oct. 20, 1953        B. A. BUSS        2,655,744

CONTROL FOR FLUID OPERATED PRESSES

Filed Oct. 15, 1948        3 Sheets-Sheet 1

Benjamin Alvin Buss
INVENTOR.

BY

Bruno C. Lechler

ATTORNEY

Oct. 20, 1953  B. A. BUSS  2,655,744
CONTROL FOR FLUID OPERATED PRESSES
Filed Oct. 15, 1948  3 Sheets-Sheet 2
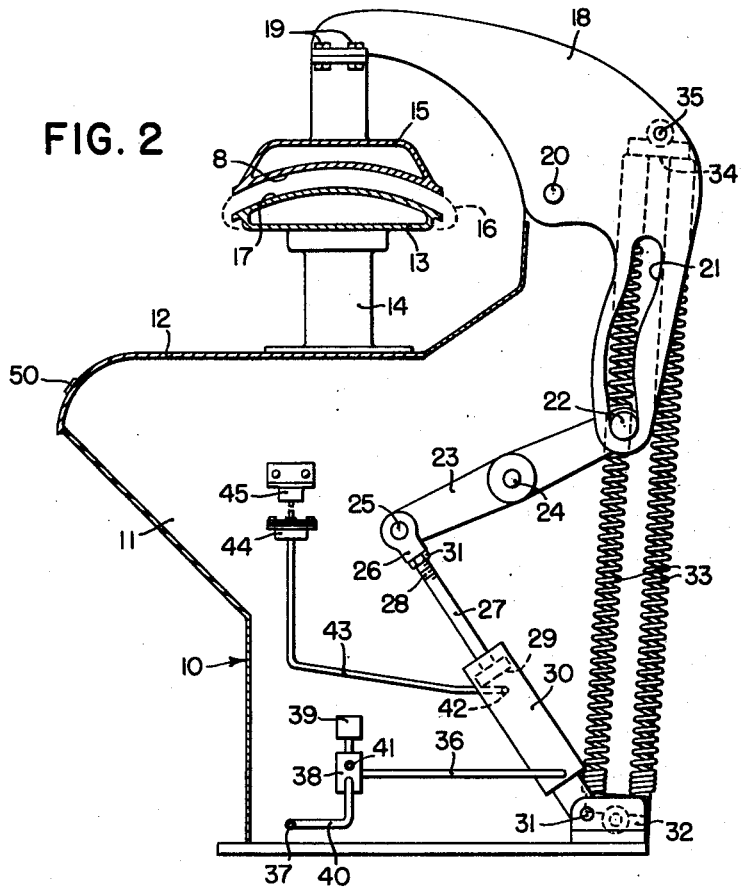
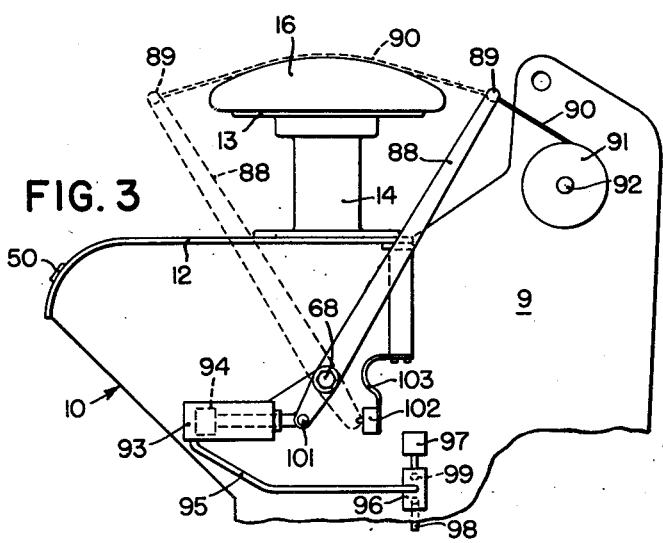
Benjamin Alvin Buss
INVENTOR.
BY Bruno C. Lechler
ATTORNEY Patented Oct. 20, 1953

2,655,744

UNITED STATES PATENT OFFICE 2,655,744

CONTROL FOR FLUID OPERATED PRESSES

Benjamin Alvin Buss, East Moline, Ill., assignor to American Machine and Metals, Inc., New York, N. Y., a corporation of Delaware Application October 15, 1948, Serial No. 54,720

4 Claims. (Cl. 38—13)

This invention relates to a control for fluid power operated laundry or similar presses which will permit fast operation.

Laundry presses, tailoring presses and the like have a buck on which the work to be pressed is laid out and a heated head which, by power, is brought down rapidly close to the buck and is then squeezed tightly against the buck. The power commonly used is air under pressure but might be any other fluid. To protect the operator, the control releasing the power mechanism which brings the head down should not function unless both of the operator's hands are occupied while the head is coming down close to the buck. Once the head is so close to the buck that the danger of getting the fingers between head and buck is eliminated, automatic mechanism takes over and holds the fluid valves open while the head is coming into close contact with the buck and subsequently head and buck are squeezed together.

The invention contemplates actuating the automatic holding mechanism by means of air taken from the side of the cylinder which is customary in air controlled presses, the port to be provided in the side of the cylinder to serve that purpose being so situated that the piston movable in that cylinder will not uncover this port for the passage of air out to the automatic holding mechanism before the press has closed to a safe position. The arrangement is preferably such that the first half of the piston stroke moves the linkage operating the movable press part to the point where the press is about closed and the second half is used for the squeeze so that a minor change in height of the pressing parts, such as due to padding or to wear of such padding, will not seriously affect the adjustment of the machine.

One of the objects of the invention is to permit an adjustment of the position of the pressing head relative to the port in the side of the cylinder by changing the length of the piston rod after assembly. By merely loosening a lock nut the rod may be made of a slightly greater effective length to bring to the proper position the point in the approach of the head to the buck where the automatic holding mechanism takes over.

It has long been known that though a press has been adjusted so that the operator must hold her hands on the controls until the head has reached a point so close to the buck that she no longer has a chance to insert her fingers between the head and buck, the point where locking takes place will vary somewhat under operating conditions. This is because the inertia of the head and the pressure of the operating fluid enter into the adjustment. Thus, a head that will function perfectly with 80 lbs. pressure in the air line may slam when the air has a pressure of 100 lbs. or, conversely, if adjusted for 100 lbs., may not function properly when the pressure is below that value. In general, it is possible with most controls to remove the hands a split second before the head has actually arrived at the point where the automatic mechanism takes over by establishing a by-pass. If advantage is taken of the possibility afforded by the present invention to operate at high speed, inertia becomes increasingly troublesome. It is an object of the invention to provide a control which cannot put the automatic locking mechanism into action regardless of inertia of the head or other factors without the operator actually having her hands on the controls when locking takes place.

In order to make the closing easy, the invention contemplates an electric circuit having two buttons, one for control by each hand, each button merely closing a switch, the two switches being in series in a circuit which controls a solenoid that opens the air valve. This affords the possibility of using a larger air valve than could be operated by the fingers of the operator so that a faster closing of the press is achieved than when the air circuit is directly controlled by the fingers of the operator. Prior attempts to develop a press along these lines have been unsafe because the automatic mechanism for holding the air applied comprising a by-pass circuit around the finger controls contained a switch closed by the press itself when the head got close to the buck. This proved dangerous and unreliable. The operation of a so actuated switch is affected not only by variations in the pressure of the pressure fluid, by the wear of the padding, by possible short circuits, but also, and especially so, by the inertia of the press head. Repeated readjustments of the position of the switch mentioned were necessary in the heretofore used electric controls to compensate for wear of the linkage elements and/or the padding, but even with exact adjustment of the switch the inertia of the press was apt to cause accidents. Particularly when the pressure fluid is air, the head does not stop traveling the instant the air vale is closed. Expansion of the air in the cylinder and inertia will carry the head past the locking point even though the operator took her fingers off the control a bit too soon and perhaps inserted them into the press to correct the work laid on the buck. In that event, the by-pass being established by the inertia coast of the head, the operator's fingers are burned and crushed and her hands are not free to release the press. In contrast thereto the invention uses a combination of air circuits and electric circuits in such a way that if the operator takes her fingers off the manual controls a trifle too soon the press will not lock in spite of the fact that the head might "overshoot" the position at which normally locking would take place. As mentioned before, the press will only lock if the operator's hands are on the manual controls when the locking position is reached. Even if the operator should get her fingers between the press in that split second during which inertia coast of the head might be possible prior to its reversal, the worst the operator could suffer would be a momentary singeing of her fingers. They will, however, not be crushed—one of the features of the invention being that, though the air comes out through the side port of the cylinder and thereby closes the switch which normally puts the by-pass circuit into action, that circuit still will not be set up unless at the same time the operator's fingers are maintaining the two-hand control circuit.

Since ordinarily one operator is serving several presses it is important that the press can be released by an instantaneous touch that can be given by the operator's hands merely touching the release button. Accordingly, it is a further object of the invention to make the release truly instantaneous.

When the release button is pressed, the circuit through the solenoid which controls the air valve is broken but upon release of this button before the air has had a chance to come out of the cylinder and the piston has passed back past the port in the side of the cylinder, which takes an appreciable length of time, the circuit would be reestablished. To prevent this, the invention provides for such an arrangement that, once the release button is pushed, the electric circuit to the air valve stays open until the press has fully opened and is again closed fully by manual control.

In some types of presses designed for special work, such as shirt presses, various work retainers are used. These work retainers, such as collar and tail clamps, are applied to the work after it is laid on the buck and before the head comes down. These work retainers are also power actuated. It is a further object of the invention that the release button, when instantaneously touched, will throw out not merely the automatic holding devices for the press closure but also for these work retainers so that the one touch will open them all.

A further object of the invention is to use work holding devices that are manually moved toward the work and are then automatically held against the work by power together with a control which, upon touching a release button to open the press, will close a circuit through a relay that will hold the circuits controlling the air valves on the work holding devices in air exhaust position until the devices have actually gone to release position and will then pre-condition the circuits so that when the work holding devices are manually approached to their work the circuits will be reestablished.

Another object of the invention is to provide a fluid operated shirt press having a manually applicable neckband clamp and a tail clamp which two clamps can be locked in applied position by means of fluid pressure responsive devices electrically controlled in such a manner that the tail clamp cannot be locked in position before the neckband clamp has been locked in position.

Another object of the invention is to provide a fluid operated, electrically controlled shirt press having a neckband clamp and a tail clamp which two clamps can be locked in applied position by means of fluid pressure responsive devices, each of these devices being controlled by a solenoid de-energizable by means of a relay whose coil, when energized, will operate to immediately open the circuits through both the solenoids for the two clamps and to hold them open without regard to the pressure condition existing in said fluid pressure responsive devices.

Other objects of the invention will appear as the description proceeds, reference being had to the accompanying drawings which illustrate the invention in the example of a shirt press and in which:

Fig. 1 is a front elevation;

Fig. 2 a side elevation partly in section along line 2—2 of Fig. 1; and

Fig. 3 a fragmentary end view in the direction of the line 3—3 of Fig. 1 of the press.

Fig. 4 shows a fluid operated switch in detail, and

Figure 1:
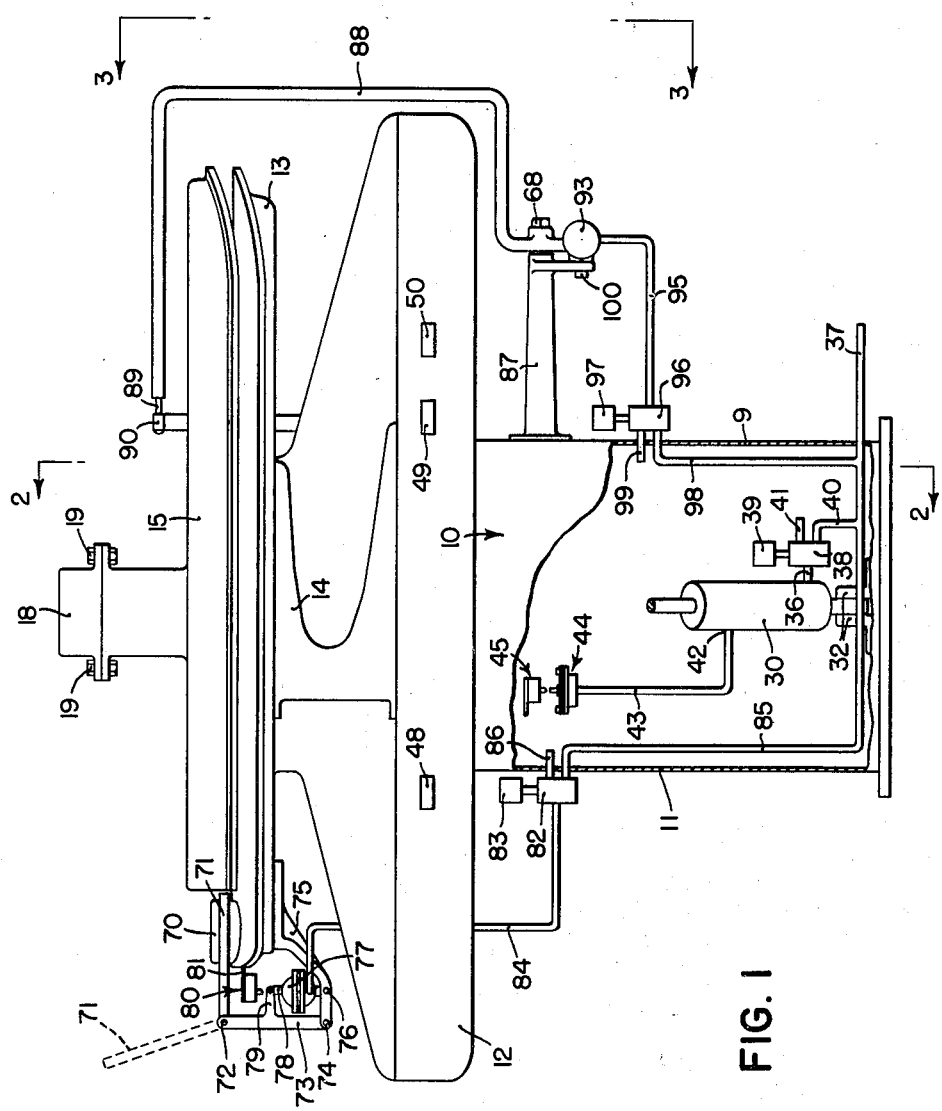

Supported on a base 10 having side pieces 11 and 9 and carrying a table 12 are the two conventional pressing members of the press which are movable relative to each other and which in the example shown are formed by a stationary buck 13 and a movable press head 15. The stationary buck 13 is placed on a gooseneck 14 and carries a padding 16 on its top surface 17. Both the buck 13 and the press head 15 may be hollow for the purpose of being heated by any suitable heating means, such as by steam entering the hollow spaces of the two pressing members 13 and 15, as is well known in the art. The head 15 is rigidly attached, such as by screws 19, to a yoke 18 which is tiltable about a pivot 20 supported by the side pieces 11, 9 of the base 10. Engaging a curved slot 21 provided in the yoke 18 is a roller 22 carried by the one end of a two-armed lever 23 which is pivoted at 24 to the base 10 and whose other end is linked at 25 to a clevis 26 into which there is threaded the end 28 of a piston rod 27 carrying a piston 29. The piston 29 is movable in a cylinder 30, which is pivoted at 31 to a frame 32 forming part of the stationary base 10. The cylinder 30 can be supplied with pressure fluid, e. g. air, through a pipe 36 connecting to the cylinder 30 near the bottom end thereof. By threading the end 28 of the piston rod 27 more or less into the clevis 26 the effective length of this piston rod may be adjusted. A lock nut 31 serves to lock the piston rod 27 in the adjusted position relative to the clevis 26.

Upon the creation of sufficient fluid pressure in the cylinder 30 the piston 29 moves into the illustrated raised position in which it holds the head 15 pressed against the buck 13. Opposed by the fluid pressure in the cylinder 30, one or more springs 33 anchored at one end to the frame 32 and at the other end to a cross-bar 34 pivoted at 35 to the yoke 18 tend to open the press. Failing sufficient fluid pressure in the cylinder 30 the springs 33 contract and turn the yoke 18 about its pivot 20 in clockwise direction to open the press. Thereby the lever 23, whose roller 22 travels in the slot 21 of the yoke 18, is turned about its fulcrum 24 in counterclockwise direction so that the piston 29 descends in the cylinder 30.

The admission of the pressure fluid, such as air, from a source 37 through the pipe 36 into the cylinder 30 is controlled by a valve 38 operable by a solenoid 39. The valve 38 may be, as conventional with fluid operated garment presses, a three-way valve adapted to connect the pipe 36 to one or the other of two conduits 40 and 41, 40 being an inlet conduit connected to the source of fluid pressure 37, and 41 an exhaust conduit. When the solenoid 39 is energized, it places the valve 38 in the position in which it connects the cylinder 30 with the inlet conduit 40, whereas upon de-energization of the solenoid 39 the valve 38 assumes such a position that the cylinder 30 communicates with the exhaust 41.

Branched from the side of the cylinder 30 at an intermediate point 42 of the stroke of the piston 29 is a conduit 43 leading to a fluid pressure responsive device 44, shown in the drawing as a diaphragm valve. The diaphragm valve or other fluid pressure responsive device 44 actuates a switch 45 in a manner and for a purpose to be described presently.

Figure 5:
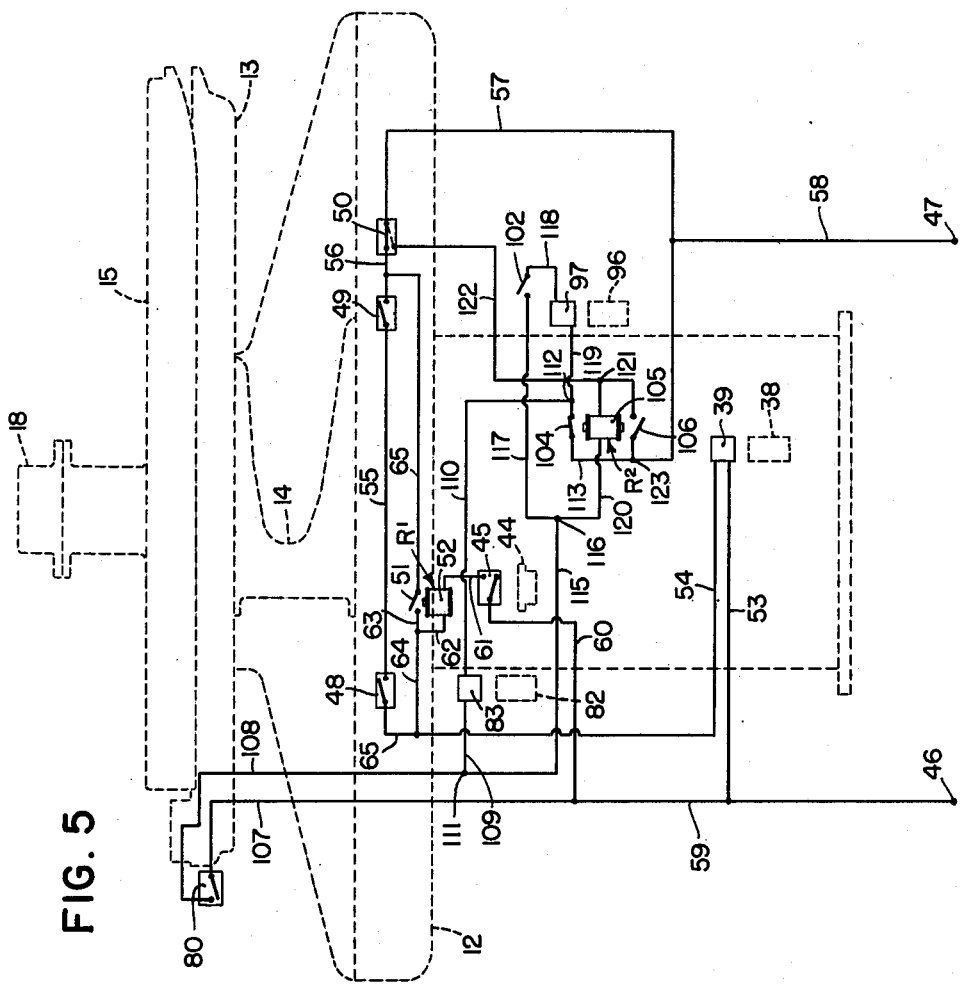
Fig. 5 is a diagrammatic representation of the electric circuits superimposed on a front view of the press drawn similar to that shown in Fig. 1 but only in outline.

The solenoid 39 can be supplied with current from a current source 46, 47 (see Fig. 5) over a circuit including two manual switches 48, 49 which are spaced apart sufficiently to force the operator to use both hands to operate them. This circuit also includes a release switch 50. Assuming the press being open, actuation of the two manual switches 48, 49 will close a circuit extending from the terminal 46 of the electric current source 46, through a lead 53, the solenoid 39, a lead 54, the manual switch 48, a lead 55, the second manual switch 49, a lead 56, a normally closed release switch 50, a lead 57, and a lead 58 to the second terminal 47 of the current source 46, 47. The solenoid 39 being thus energized operates the valve 38 in such a manner as to admit pressure fluid through the pipe 36 into the cylinder 30. The piston 29 rises in the cylinder 30 moving thereby the press head 15 towards the buck 13. The port 42 being situated at an intermediate point of the length of the cylinder 30, the piston 29, after having uncovered the port 42 to admit pressure through the conduit 43 to the fluid pressure responsive actuating device 44 for the switch 45, may move an appreciable distance beyond that port 42. In particular, the piston 29 can always extend its stroke far enough to bring about contact of desired pressure between the press head 15 and the article to be ironed placed on the padding 16 on the buck 13 in spite of any wear of the parts of the press and especially of any reduction in the thickness of the padding 16 which always takes place upon extended use of the press. There does not arise any need for adjustment of the switch 45 or its actuating device 44 in consequence of the just mentioned wear of the padding or other parts of the press. If the length of the piston rod 27 was adjusted so at the time of the assembly or the installation of the press that the piston 29 would pass the port 42 in the side wall of the cylinder 30 just at the time the head 15 would come into contact with the padding 16, no further adjustment is needed. Any wear of the padding will not cause the press to lock before the opening between the pressing head and the padding has become less than the thickness of a human finger.

Parallel to the two-hand safety control 48, 49 there is arranged a switch 51 which forms the armature of a relay R1 whose coil is indicated at 52. The armature 51 and the coil 52 are arranged in series in a holding circuit containing the fluid operated switch 45 and extending from the terminal 46 through leads 59 and 60, switch 45, a lead 61, coil 52 of relay R1, leads 62 and 63, armature 51 of relay R1, leads 65 and 56, release switch 50, and leads 57 and 58 to terminal 47. This circuit is closed when, with the release switch 50 in its normal closed position, both the switches 45 and 51, are closed. Of these two switches first the switch 45 has to close which it does due to pressure coming from the cylinder 30 through the conduit 43 when the press head 15 has reached a safe position. This pressure causes the diaphragm in the diaphragm valve 44 to push up an actuating pin 66 and thereby to actuate the lever 67 of the switch 45 which preferably is a micro-switch. The switch 45 being thus closed, an energizing circuit is established extending from terminal 46 through lines 59 and 60, fluid operated switch 45, line 61, coil 52 of relay R1, lead 62, a lead 64, a lead 65, manual switch 48, lead 55, manual switch 49, lead 56, release switch 50 and leads 57 and 58 to terminal 47. As through this circuit the relay coil 52 is energized the switch 51 closes and thereby establishes the above mentioned holding circuit. Since this holding circuit by-passes the two-hand safety control 48, 49, the solenoid 39, which controls the pressure fluid supply to the cylinder 30 remains energized also after the operator has released the two-hand control 48, 49.

To open the press, the release switch 50 is depressed. Since the manual switches 48, 49 are open, the opening of the switch 50 interrupts the holding circuit through the coil 52 of the relay R1 and, due to opening of the switch 51 caused thereby, also the circuit through the solenoid 39 which controls the admission of the pressure fluid to the cylinder 30. The solenoid 39, being thus de-energized, permits the valve 38 to open the exhaust 41 whereupon the piston 29 descends in the cylinder 30 assuming a position below the port 42 in which it cuts off the diaphragm valve 44 from fluid pressure. Consequently, also the fluid operated switch 45 opens. It is not necessary to actuate the release switch 50 more than momentarily since that is sufficient to cause the opening of the switch 51 and, as soon as the switch 51 has opened, the return of the release switch 50 to its initial position will not re-establish the circuits of which this switch 51 forms a part. In order to re-establish the holding circuit through the relay coil 52 it is necessary to energize this coil 52 by means of a circuit which is independent of the switch 51. This means that for this purpose it is necessary to again actuate the two-hand control 48, 49. As has been described before, the actuation of the two-hand control 48, 49 brings about first the energization of the solenoid 39 and in consequence thereof the closing of the switch 45, thus establishing the aforementioned energizing circuit which contains the switch 45, the relay coil 52 and extends from this coil through the leads 62, 64 and 65 to the two-hand control. The coil 52 being thus energized, the switch 51 closes and re-establishes the holding circuit which is independent of the manual switches 48 and 49.

It will be noted that if the relay R1 were omitted (which would mean a direct connection between the lead 61 and the lead 65), the press could not be opened by actuation of the release switch 50 unless this switch 50 were held depressed long enough to allow the pressure fluid in the cylinder 30 to escape to such an extent that the piston 29 passes below the port 42 and thereby causes the opening of the fluid operated switch 45. With the relay R1 arranged as shown, the holding circuit is rendered inactive instantly upon the actuation of the release switch 50 regardless of the fluid operated switch 45. On the other hand, this fluid operated switch 45 will prevent locking of the press if the pressure fluid supply to the cylinder 30 should fail for any cause. Again, such failure will carry with it the opening of the switch 51. Neither can the switch 51 be returned to its closed position nor will the solenoid 39 become re-energized for opening of the valve 38 solely by the removal of the previously existing defect in the pressure fluid supply, but it takes again the operation of the two-hand safety control 48, 49 to start the closing cycle of the press.

The control device as described so far is useable for any type of tailoring or laundry press.

In addition to this control device the drawing shows control means interrelated with said control device and adapted to control the operation of a neckband clamp and a tail clamp as are commonly used for shirt presses.

As will be best seen from Fig. 1, there is attached to one end of the buck 13 a neckband clamp comprising a neckband form 70, with which a spring band or clamp 71 can cooperate. The band or clamp 71 is pivoted at 72 to a T-shaped lever 73 that is linked at 74 to a bracket 75 secured to the buck 13. To hold the collar of a shirt to be ironed in place around the neckband form 70, the clamp 71 is manually swung from the upright position shown in dotted lines to the horizontal position shown in full lines. Also linked to the bracket 75, at 76, is the housing of a fluid pressure responsive holding device 77 which, in the example shown, has a diaphragm which, in response to fluid pressure in a connecting line, moves member 78 which is connected to an arm 79 of the T-shaped lever 73. Placed above the arm 79 is a microswitch 80 which may be supported on a resilient member 81 secured to the buck 13. The position of the switch 80 relative to the arm 79 is such that when the T-lever 73 is manually pushed to the left to apply the clamp 71 to the neckband form 70, the arm 79 of lever 73 comes into contact with the switch 80 and closes it. The clamp 71 is held in the applied position by the fluid pressure responsive device 77 as long as the member 78 thereof is raised, that is to say, as long as the device 77 is under pressure. The admission of pressure fluid to the diaphragm device 77 is controlled by a three-way valve 82 which is operated by a solenoid 83 and is connected with the diaphragm device 77 by means of a conduit 84. The inlet side of the three-way valve 82 is connected to the source of pressure fluid 37 by means of a conduit 85, whereas its outlet side opens into an exhaust 86.

Cooperating with the end of the buck 13 which is opposite to the end to which the neckband clamp is attached is a tail clamp. Various types of tail clamps are known and while the tail clamp control device forming a part of this invention is shown in connection with one particular type of tail clamp, it is to be understood that the invention is applicable to any type of tail clamp. In the type used for illustration, a bracket 87 extending out from the side 9 of the base 10 has pivoted thereon at 68 an arm 88 which is bent so as to extend around the end of the table 12 and the buck 13 and which carries at its upper end a horizontal stud 89 to which one end of a spring band 90 is attached. The other end of the spring band 90 is secured to a spring reel 91 mounted on a stud 92 which is carried by the side piece 9. The coiled spring in reel 91 keeps the tail clamp 88, 89 in the position shown in Fig. 3 in full lines except when it is manually drawn forward or when pressure fluid, such as air, is supplied to a fluid pressure responsive device 93. In the example illustrated in the drawing the device 93 is shown as a cylinder in which a piston 94 is reciprocable and which obtains pressure fluid through a conduit 95 under the control of a three-way valve 96 operable by a solenoid 97. 98 denotes a conduit connecting the inlet side of the three-way valve 96 with the source of pressure fluid 37, and 99 is an exhaust outlet. Like the exhaust 41 of the three-way valve 38 the exhaust 86 of the three-way valve 82 and the exhaust 99 of the three-way valve 96 are illustrated as opening directly into the outside air. Where air under pressure is used as the pressure fluid, this arrangement is quite satisfactory. Where a liquid is used as the pressure fluid, the liquid escaping through the various exhaust outlets would conveniently be led to a common sump. The cylinder 93 is pivoted at 100 to an arm extending from bracket 87 and the end of the piston 94 is linked at 101 to the lower end of the lever 88. A microswitch 102 mounted on a resilient support 103 is arranged in such relative position to the lever 88 that when this lever is turned about the pivot 68 in counter-clockwise direction to the position indicated in dotted lines in Fig. 3 the lower end of the arm 88 engages the microswitch 102 so as to close it.

The switch 80, which, as mentioned before, becomes closed when the neckband clamp 71 is manually swung into place, forms part of a circuit which contains the solenoid 83 coordinated to the neckband clamp as well as of a circuit containing the solenoid 97 and the switch 102, both coordinated to the tail clamp. These two circuits controlled by the switch 80 have furthermore in common a normally closed contact 104 which is actuatable by the coil 105 of a relay R2 which operates also a normally open contact 106. The arrangement is such that the coil 105 operates the two contacts 104 and 106 simultaneously but in opposite directions so that when the coil 105 opens the contact 104 it closes the contact 106 and vice versa. Since the circuit for the tail clamp solenoid 97 includes the switch 80 operable by the neckband clamp, the tail clamp cannot be locked until the neckband clamp is locked. The locking of the two clamps takes place in the following manner: Upon swinging down the neckband clamp 71 and thereby closing the contact 80, a circuit is established extending from the terminal 46 through lead 59, a lead 107, closed switch 80, a lead 108, point 111, a lead 109, solenoid 83, a lead 110, point 112, closed armature contact 104, a lead 113, and lead 58 to terminal 47. The solenoid 83 thus energized operates the valve 82 so as to supply pressure fluid to the diaphragm device 77 and thus to elevate the member 78 thereof so that the T-lever 73 and thereby the neckband clamp 71 is held in the active position. As long as the switch 102 is open the tail clamp solenoid 97 remains dead. Upon closing of the switch 102, however, such as by swinging forward the arm 88 with the spring band 90, a circuit is formed which extends from terminal 46 through the circuit elements 59, 107, 80, 108 to point 111 and from there through a lead 115, point 116, a lead 117, now closed switch 102, a lead 118, solenoid 97, and a lead 119 to point 112, joining here the return lead to terminal 47 for the circuit through the neckband solenoid 83 which return lead includes the elements 104, 113 and 58. The tail clamp solenoid 97 becoming thus energized, its coordinated three-way valve 96 supplies pressure fluid through the conduit 95 to the cylinder 93 so that the piston 94 holds the lower end of the lever 88 in engagement with the microswitch 102 and thereby holds the tail clamp locked.

It has been previously described in what manner a momentary actutaion of the release switch 50 releases the press head 15 of the press. Subordinated to the operation of the same release switch 50 is an energizing circuit for the coil 105 of the relay R2 so that by the momentary actuation of the switch 50 not only the press head 15 but also the neckband clamp and the tail clamp become released. When the release switch 50 is depressed to the position shown in dotted lines in Fig. 5, a circuit is established extending from terminal 46 over 59, 107, 80, 108, 111 and 115 to point 116, and from there through a lead 120, the coil 105 of relay R2, point 121, a lead 122, the momentarily depressed switch 50, and leads 57 and 58 to terminal 47. The relay coil 105 being thus energized, it operates its armature 104, 106, opening the contact 104 and closing the contact 106. The closing of the contact 106 establishes a holding circuit for the coil 105 extending from the terminal 46 through 59, 107, 80, 108, 111, 105, 116, 120, 105 to point 121 and from there through a lead to relay contact 106, point 123, and lead 58 to terminal 47. This holding circuit holds the relay coil 105 energized independently of the release switch 50 as long as the switch 80 remains closed. Since the contact 104 is in series with both the neckband clamp solenoid 83 and the tail clamp solenoid 97, both these solenoids become deenergized upon the opening of the contact 104. The solenoids become deenergized despite the fact that points 111 and 116 are now connected by two parallel circuits. The one circuit is through line 115, the other circuit through solenoid 83, line 110, point 112, solenoid 97, line 118, switch 102, line 117. Since each of the solenoids 83, 97, 105 is designed to operate with the current created by connecting it across the full voltage between lines 46 and 47, the amount of current which could flow through the parallel circuit described which includes solenoids 83 and 97 will be such an infinitesimal part of the current flowing through line 115 as to be inadequate to operate the solenoids 83 and 97. Consequently, the three-way valves 82 and 96 operated by these solenoids 83, 97, respectively, shut off the pressure fluid supply to the fluid operated devices 77 and 93, respectively, so that the neckband clamp and the tail clamp open. Due to the opening of the neckband clamp the switch 80 opens and this, in turn, breaks the circuit through the coil 105 of the relay R2, permitting the armature 104, 106 of this relay to revert to their initial position shown in Fig. 5, wherein contact 104 is closed and contact 106, which formerly held closed the holding circuit for the coil 105, is open. It will be noted that the relay R2 assures that the release switch 50 can be permitted to return to its initial position after having been only momentarily operated without causing by this return reenergization of the clamp solenoids 83 and 97. In this respect the relay R2 has a complementary action to the relay R1 without which the press could not be opened without holding the release switch 50 depressed for an extended length of time.

While I have shown in the drawing one particular embodiment of the invention I desire it to be understood that this particular embodiment has been given by way of example only and that various changes, modifications and rearrangements of parts may be made without departing from the spirit of the invention or the scope of the appended claims.

What I claim is:

1. In a fluid actuated and electrically controlled shirt press complete with a neck band clamp and a tail clamp, all of which can be released by an instantaneous contact with a single switch which will permit the fluid to escape and reset the press, in combination, a source of fluid under pressure, a press buck, a neck band clamp cooperating with said buck, a tail clamp also cooperating with said buck, a head movable against said buck, fluid operated means connected with said head and said source of fluid for moving said head against said buck, a prime electric circuit for controlling the admissions of fluid to said fluid operated means, a fluid operated holding means for each of said clamps connected with said press and said fluid source, secondary electric circuits for controlling the admission of fluid to said clamp holding means, switches in said secondary circuits adapted to be mechanically engaged and closed by the manual positioning of said clamps, a first relay in said prime circuit, a maintaining circuit holding said first relay closed, a second relay adapted to open the secondary circuits associated with the holding means, a maintaining circuit to cause said second relay to hold said secondary circuits open, and a double action switch included in said prime and maintaining circuits which when instantaneously manualy actuated breaks the maintaining circuit of the first relay in the prime circuit and establishes the maintaining circuit for the second relay.

2. In a fluid actuated and electrically controlled shirt press complete with a neck band clamp and a tail clamp, all of which can be released by an instantaneous contact with a single switch which will permit the fluid to escape and reset the press and clamps, in combination, a source of fluid under pressure, a press buck, a neck band clamp cooperating with said buck, a tail clamp also cooperating with said buck, a head movable against said buck, fluid operated means connected with said head and said source of fluid for moving said head against said buck, a prime electric circuit for controlling the admission of fluid to said fluid operated means, a fluid operated holding means for said neck band clamp connected with said clamp and said source of fluid, a secondary electric circuit for controlling the admission of fluid to said neck band clamp holding means, a switch in said secondary circuit mechanically engaged and closed by said neck band clamp, a fluid operated holding means for said tail clamp connected with said clamp and said source of fluid, a branch of said secondary circuit for controlling the admission of fluid to said tail clamp holding means, a switch in said branch circuit mechanically engaged and closed by said tail clamp, a first relay in said prime circuit, a first maintaining circuit including said first relay for holding said prime circuit closed, a second relay adapted to open the circuit associated with the neck band clamp and tail clamp holding means, a second maintaining circuit including said second relay and said switch closed by said neck band clamp, and a single switch which when instantaneously manually actuated breaks the maintaining circuit of the first relay in the prime circuit and establishes the second maintaining circuit holding the relay in the second maintaining circuit actuated until the escape of fluid from the neck band holding means allows the holding means to move away from the buck and open the switch which breaks the maintaining circuit of the second relay.

3. In a press having a buck mounted on a frame, a head mounted on the frame for movement to and from the buck, a fluid motor including a cylinder secured to the frame and a piston movable within the cylinder; said piston being connected with the head and having positions within the cylinder related to the positions of the head with respect to the buck, and pressure fluid supply means for said motor; the combination of control means for the press comprising, valve means in said fluid supply means for controlling the admission and exhaust of pressure fluid to and from said cylinder, an electric control circuit including a solenoid for operating said valve means, a two-hand safety control connected in said control circuit and in series with said solenoid, an electric holding circuit from said electric supply means to said solenoid by-passing said two-hand safety control, a normally open switch in said holding circuit, fluid actuated means for closing said switch, a conduit connected to said cylinder and said fluid actuated means for conducting fluid to said fluid actuated means from a position intermediate the ends of said cylinder related to a position of said head adjacent said buck, said switch being closed by said fluid actuated means to maintain said holding circuit as long as the piston is located beyond the point in the cylinder where the conduit connects thereto.

4. In a press having a buck mounted on a frame, a head mounted on the frame for movement to and from the buck, a fluid motor including a cylinder secured to the frame and a piston movable within the cylinder, said piston being connected with the head and having positions within the cylinder related to the positions of the head with respect to the buck, and pressure fluid supply means for said motor; the combination of control means for the press comprising, valve means in said fluid supply means for controlling the admission and exhaust of pressure fluid to and from said cylinder, an electric control circuit including a solenoid for operating said valve means, a two-hand safety control connected in said control circuit in series with said solenoid, an electric holding circuit from said control circuit to said solenoid by-passing said two-hand safety control, a normally open switch in said holding circuit, fluid actuated means for closing said normally open switch, a conduit connected to said cylinder and said fluid actuated means for conducting fluid to said fluid actuated means from a position intermediate the ends of said cylinder related to a position of said head adjacent said buck, said switch being closed by said fluid actuated means to maintain said holding circuit as long as the piston is located beyond the point in the cylinder where the conduit connects thereto, a relay energizable upon operation of both said two-hand control and said fluid actuated closure of said normally open switch, a relay switch closed upon energization of said relay, and a normally closed release switch in series with said relay, said relay switch and said normally open fluid actuated switch.

BENJAMIN ALVIN BUSS.

References Cited in the file of this patent

UNITED STATES PATENTS

| Number | Name | Date |
|---|---|---|
| 56,304 | Whiteley | July 10, 1866 |
| 1,934,922 | Heidenfelder | Nov. 14, 1933 |
| 2,139,064 | Beattie | Dec. 6, 1938 |
| 2,302,975 | Sherman | Nov. 24, 1942 |